United States Patent Office 2,710,194
Patented June 7, 1955

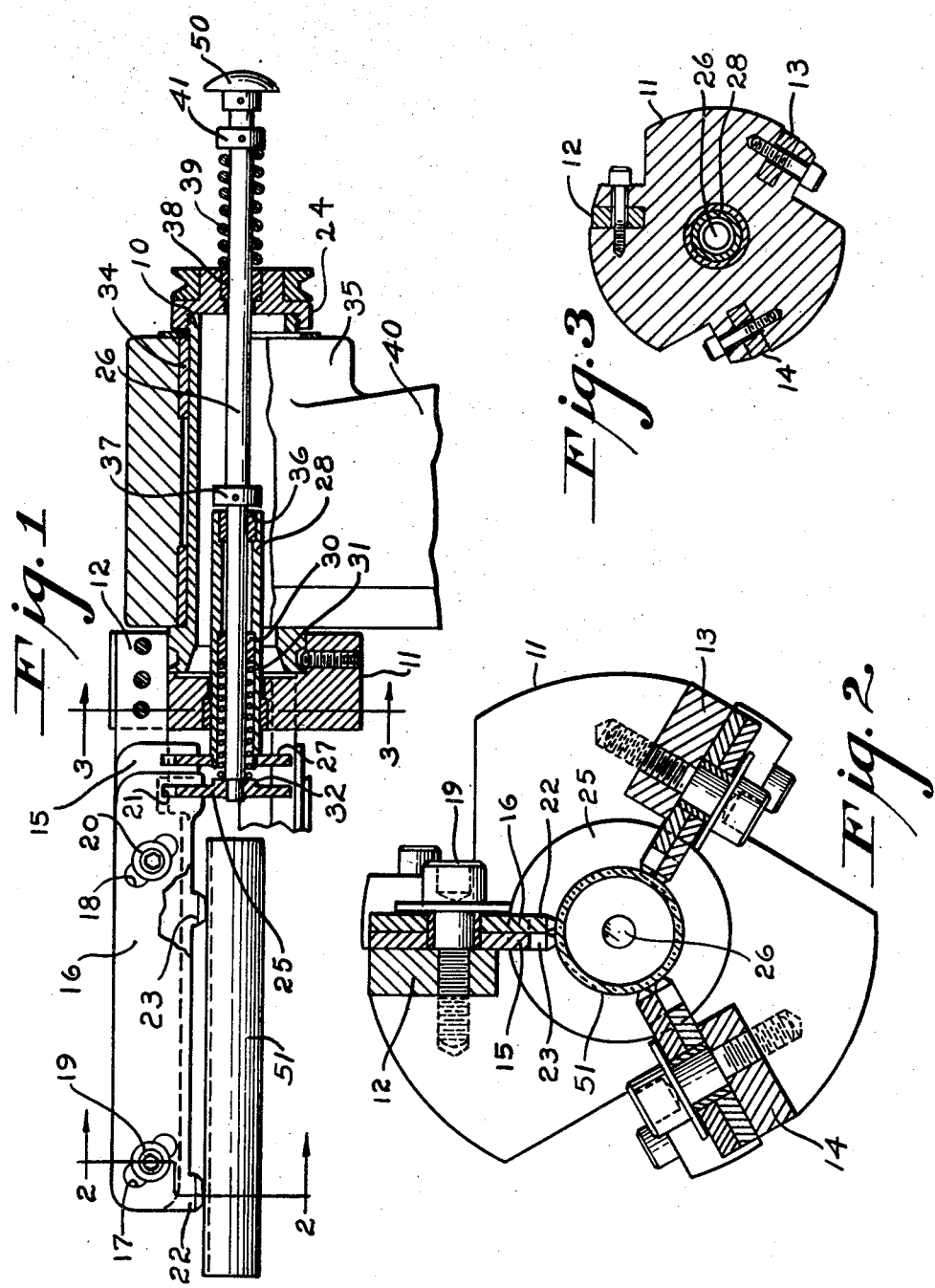

2,710,194
CHUCK ASSEMBLY

Thomas Ward Bailey, Hammondsport, N. Y., assignor to Corning Glass Works, Corning, N. Y., a corporation of New York Application December 22, 1952, Serial No. 327,317

6 Claims. (Cl. 279—106)

The present invention relates to chuck assemblies, and particularly to chuck assemblies which are satisfactory for use in holding fragile linear articles or work pieces, such for example as glass rods or tubes. Such fragile rods or tubes, owing to their method of manufacture, often vary somewhat in their degree of straightness, diameter and circularity. Therefore it sometimes becomes highly desirable to doubly chuck such articles at lineally spaced points under light spring pressure in order to reliably hold them for working with a minimum danger of breakage and with their mean center line coextensive with the axes of the chucks.

One object of the invention is to provide a chuck having a set of jaws adapted to engage and seize an article or work piece near one end thereof and having a second set of similar jaws adapted in a similar fashion to engage and to seize the article at a substantial distance from such end thereof.

Another object is to provide a chuck assembly of the foregoing character equipped with facilities for independently resiliently holding the article at each point of seizure so that the article is firmly gripped by each set of jaws irrespective of slight variations in the diameter of the article where seized.

In the accompanying drawing Fig. 1 is a side elevation partly in section of a chuck assembly embodying the invention, the one jaw fully illustrated therein being shown in seizing relation with a tubular glass body.

Fig. 2 is a sectional view taken on line 2—2 of Fig. 1.
Fig. 3 is a sectional view taken on line 3—3 of Fig. 1.

Referring to the drawing in detail, the numeral 11 designates a main support for the chuck assembly elements, said support being fixed to one end of a tubular spindle 10 rotatable in bearings such as 34 carried in the head 35 of a pedestal 40. Support 11 is suitably slotted to receive chuck jaw carrier supports 12, 13 and 14. Each of these supports has arranged thereon a chuck jaw carrier such as 15 and a chuck jaw carrier such as 16 for each of two sets of jaws 22 and 23 respectively. Each carrier is provided with elongated apertures such as 17 and 18 through which pass jaw carrier supports comprising shouldered cap screws, 19 and 20, threaded into their support, such as support 12 for example. Each carrier 15 or 16 is also provided at one end with a slot such as 21. Each carrier such as 16 of one set has a jaw 22 at its unslotted end, whereas each carrier such as 15 of the other set has a jaw 23 in the vicinity of its slotted end. The slots of each of the carriers such as 16 are all occupied by a disc 25 carried on one end of an actuator shaft 26, whereas the slots of each of the carriers such as 15 are all occupied by a disc 27 carried on one end of a sleeve 28 surrounding shaft 26. Sleeve 28, for approximately half its length from its disc carrying end, has an enlarged bore to provide for a shaft bushing 30 and space for a coil spring 31 surrounding the shaft between the end of the hub 32 of disc 25 and the bushing 30. The opposite end of the bore of sleeve 28 is also enlarged to accommodate a second shaft bushing 36. The portion of shaft 26 extending beyond bushing 36 passes through a collar 37 and a third bushing 38 mounted in the bore of a cap 24 screw threaded to the other end of spindle 10. The portion of the shaft 26 projecting beyond bushing 38 passes through a coil spring 39 held compressed between bushing 38 and a fixed collar 41. Coil spring 39 is of much heavier gauge wire than spring 31 and upon being compressed also effects a partial compression of spring 31 between disc hub 32 and bushing 30. The forces normally exerted by springs 39 and 31 tend to force the discs 25 and 27 to the right, as viewed in Fig. 1, causing their chuck jaws such as 22 and 23 to occupy their article seizing positions.

A knob 50 on the extreme right hand end of shaft 26 may readily be engaged either normally or mechanically to force the shaft to the left, as viewed in Fig. 1, to move the chuck jaw carriers such as 15 to the left and outward from their article or work seizing positions when an article such as a tube 51 is to be inserted or removed from the chuck. As will be understood, during the leftward movement of shaft 26 a similar leftward movement of sleeve 28 is effected by the shaft collar 37, so that the disc 27 is carried leftward concurrently with disc 25 to move the chuck jaw carriers such as 15 outward from their article seizing positions.

As will be understood from the foregoing the chuck jaws, such as 22, are resiliently held against an article by means of the rightward pulling action on shaft 26 by spring 39, whereas the chuck jaws such as 23 are resiliently held against such article by the rightward pushing against sleeve 28 by spring 31, such spring being compressed against the bushing 30 by the pulling force exerted on disc 25 by spring 39. Thus the respective sets of jaws are enabled to accommodate work pieces or articles which vary in size in the respectively seized areas thereof.

I claim:

1. In a chuck assembly, a first set of jaws for engaging a linear article near one end thereof, a second set of jaws for similarly engaging such article in a vicinity remote from such article end, a carrier support with respect to which jaws of both sets are movable into and out of their article engaging positions, a first spring normally compressed to hold the jaws of one set in their article engaging position, a second spring normally compressed to hold the jaws of the other set in their article engaging position, one of said springs being arranged to normally hold the other spring compressed, and an actuator operable to move the jaws of both sets out of their article engaging positions.

2. A chuck assembly such as defined by claim 1 wherein each chuck jaw is provided with a carrier arranged alongside said support such carrier having inclined slots therein, elements occupying said slots slidably anchoring said carriers to said support, said slots being so inclined that relative linear movement of said carriers on said elements and with respect to said support effects movement of the jaws between article engaging and nonengaging positions.

3. A chuck assembly such as defined by claim 2 wherein the actuator includes a shaft which supports said springs and elements also supported by said shaft directly coupled to the chuck jaw carriers of the respective sets.

4. A chuck assembly such as defined by claim 3 wherein the actuator comprises a shaft and a surrounding sleeve and elements carried thereby coupling them respectively to the carriers of the respective sets of jaws.

5. In a chuck assembly a group of linear chuck jaw carriers each having an elongated slot therein near one end thereof the lineal dimension of which is transverse to the lineal dimension of the carrier, each said carrier also having elongated apertures therethrough near opposite ends thereof the long dimension of such apertures being diagonal with respect to the lengthwise dimension of said carrier, supports for said carrier passing through said apertures, and means occupying the slots of all of said carriers and movable in paths parallel to the lineal dimension of said carriers to move them relative to their supports as dictated by the bordering outlines of their elongated apertures.

6. In a chuck assembly, a generally circular support including three linear chuck jaw carrier supports anchored at one end thereto and spaced 120° from one another along their length, two chuck jaw carriers associated with each carrier support each carrier having apertures therethrough elongated in the direction of the support centerline and having a slot therein running normal to the support centerline; associated means occupying the carrier apertures for attaching such carriers to such carrier support in movable relation thereto toward and away from the support center line, chuck jaws associated with alternate carriers near their one end, chuck jaws associated with the remaining alternate carriers near their other end, a disc occupying the slots of the carriers having chuck jaws at one end, a second disc occupying the slots of the carriers having chuck jaws at the opposite end, and means for shifting the positions of said discs along said center line to move the respective carriers toward and away from such center line.

References Cited in the file of this patent
UNITED STATES PATENTS

| | | |
|---|---|---|
| 498,835 | Atterbury | June 6, 1893 |
| 2,626,811 | Hohwart et al. | Jan. 27, 1953 |